United States Patent
Dennis et al.

(10) Patent No.: US 12,486,849 B2
(45) Date of Patent: Dec. 2, 2025

(54) MECHANISM FOR REDUCING EDDY CURRENT LOSSES IN SEALLESS PUMPS AND TURBINES HAVING DIRECTLY DRIVEN IMPELLERS

(71) Applicant: Flowserve Pte. Ltd., Singapore (SG)

(72) Inventors: Zachary Dennis, Emmaus, PA (US); Sean A. Cain, Tulsa, OK (US); Neil Havrilla, Coplay, PA (US)

(73) Assignee: Flowserve Pte. Ltd., Singapore (SG)

( * ) Notice: Subject to any disclaimer, the term of this patent is extended or adjusted under 35 U.S.C. 154(b) by 115 days.

(21) Appl. No.: 18/407,054

(22) Filed: Jan. 8, 2024

(65) Prior Publication Data

US 2025/0226716 A1 Jul. 10, 2025

(51) Int. Cl.
| | |
|---|---|
| *F04D 29/08* | (2006.01) |
| *F04D 13/06* | (2006.01) |
| *H02K 3/42* | (2006.01) |
| *H02K 21/24* | (2006.01) |

(52) U.S. Cl.
CPC ....... *F04D 13/0626* (2013.01); *F04D 29/086* (2013.01); *H02K 3/42* (2013.01); *H02K 21/24* (2013.01)

(58) Field of Classification Search
CPC ..... F04D 13/0626; F04D 29/086; H02K 3/42; H02K 5/08
See application file for complete search history.

(56) References Cited

U.S. PATENT DOCUMENTS

| | | |
|---|---|---|
| 1,632,357 A | 6/1927 | White |
| 1,949,796 A | 3/1934 | Himmel |
| 2,438,629 A | 3/1948 | Anderson |

(Continued)

FOREIGN PATENT DOCUMENTS

| | | |
|---|---|---|
| CN | 110173434 A | 8/2019 |
| EP | 2626573 A1 | 8/2013 |

(Continued)

OTHER PUBLICATIONS

International Search Report and Written Opinion for international Application No. PCT/UOS2024/060906 mail date Apr. 16, 2025, 12 pages.

(Continued)

*Primary Examiner* — Jonathan R Matthias
(74) *Attorney, Agent, or Firm* — Maine Cernota & Curran

(57) ABSTRACT

An integral motor pump (IMP) or integral motor turbine (IMT) includes an axial field permanent magnet synchronous motor (PMSM) having a stator that is sealed by a disk-shaped non-conducting stator cover axially interposed between the stator and PMSM impeller, such that eddy currents are not generated in the stator cover by the rotating permanent magnets of the impeller. The stator cover can be annular, and can be fixed directly to the stator housing, or pressed against the stator housing by brackets. The seal can be formed by an adhesive, and/or by at least one gasket. Either the stator cover or the brackets can include flanges extending axially proximate the stator housing, and attached to the stator housing by any combination of an interference fit, an adhesive, set screws, or a protrusion extending into an indentation. In embodiments, the bracket flanges are welded to the stator housing.

12 Claims, 15 Drawing Sheets

(56) References Cited

U.S. PATENT DOCUMENTS

| | | |
|---|---|---|
| 2,440,947 A | 5/1948 | Hart |
| 2,752,857 A | 7/1956 | White |
| 2,824,520 A | 2/1958 | Bartels |
| 2,855,141 A | 10/1958 | Van Rijn |
| 2,968,249 A | 1/1961 | Caine |
| 3,102,679 A | 9/1963 | Rudy |
| 3,135,212 A | 6/1964 | Arnold |
| 3,364,866 A | 1/1968 | Sato |
| 3,868,196 A | 2/1975 | Lown |
| 4,213,745 A | 7/1980 | Roberts |
| 4,508,998 A | 4/1985 | Hahn |
| 4,806,080 A | 2/1989 | Mizobuchi |
| 5,117,141 A | 5/1992 | Hawsey |
| 5,158,440 A | 10/1992 | Cooper |
| 5,269,664 A | 12/1993 | Buse |
| 5,332,374 A * | 7/1994 | Kricker .............. F04D 13/027 417/420 |
| 5,494,418 A | 2/1996 | Moriya |
| 5,567,133 A | 10/1996 | Kobaybashi |
| 5,713,727 A | 2/1998 | Veronesi et al. |
| 6,012,909 A * | 1/2000 | Sloteman ............ F04D 29/5806 417/370 |
| 6,034,465 A | 3/2000 | Mckee |
| 6,056,518 A | 5/2000 | Allen |
| 6,135,098 A | 10/2000 | Allen |
| 6,175,173 B1 | 1/2001 | Stephan |
| 6,422,838 B1 | 7/2002 | Sloteman |
| 6,835,051 B2 | 12/2004 | Heim |
| 7,067,950 B2 | 6/2006 | Hirzel |
| 8,303,268 B2 | 11/2012 | Werson |
| 11,323,003 B2 | 5/2022 | Judge |
| 2002/0035974 A1 | 3/2002 | Pawellek |
| 2002/0106290 A1 | 8/2002 | Bader |
| 2003/0021683 A1 | 1/2003 | Capone |
| 2004/0013547 A1* | 1/2004 | Allen ................ F04D 13/0633 417/423.1 |
| 2004/0234399 A1 | 11/2004 | Lopatinsky |
| 2005/0196269 A1 | 9/2005 | Racer |
| 2007/0048158 A1 | 3/2007 | Kochan, Jr. |
| 2009/0208349 A1 | 8/2009 | Eller |
| 2011/0164995 A1 | 7/2011 | Genster |
| 2011/0238172 A1 | 9/2011 | Akdis |
| 2011/0318175 A1 | 12/2011 | Converse |
| 2013/0028760 A1 | 1/2013 | Lin |
| 2013/0213325 A1 | 8/2013 | Kim |
| 2013/0236341 A1 | 9/2013 | Anderson |
| 2015/0104335 A1 | 4/2015 | Faller |
| 2016/0006379 A1 | 1/2016 | Wang et al. |
| 2016/0072362 A1 | 3/2016 | Kube |
| 2016/0305447 A1 | 10/2016 | Dreiss et al. |
| 2019/0145428 A1 | 5/2019 | Judge et al. |
| 2020/0067376 A1* | 2/2020 | Judge ..................... F04D 1/08 |
| 2021/0140439 A1 | 5/2021 | Da Silva |

FOREIGN PATENT DOCUMENTS

| | | |
|---|---|---|
| WO | 9908366 A1 | 2/1999 |
| WO | 2010081123 A1 | 7/2010 |

OTHER PUBLICATIONS

PCT International Search Report & Written Opinion for Appl No. PCT/US2018/060690 dtd Mar. 12, 2019, 17 pages.

Office Action for U.S. Appl. No. 16/204,997 dated Jul. 2, 2020, 6 Pages.

Office Action for U.S. Appl. No. 16/668,665, dated Dec. 4, 2020, 6 Pages.

Office Action for U.S. Appl. No. 16/668,665, dated Jan. 15, 2021, 50 Pages.

International Search Report and Written Opinion for PCT Appl. No. PCT/US2020/056972, mail date Feb. 17, 2021, 11 Pages.

Office Action for U.S. Appl. No. 16/668,665, dated May 3, 2021, 27 Pages.

Advisory Action for U.S. Appl. No. 16/668,665 mail date Jul. 14, 2021, 5 pages.

Notice of Allowance for U.S. Appl. No. 16/668,665 mail date Feb. 22, 2022, 17 Pages.

International Preliminary Report on Patentability for PCT Appl. No. PCT/US2020/056972 Mail Date May 12, 2022, 8 pages.

Office Action for India Appl. No. 202217025766, dated Aug. 18, 2022, 7 pages.

Extended European Search Report of EP Appl No. 20882691.7, mail date Nov. 11, 2022, 8 pages.

Office Action for JP application No. 2022-524573 mail date Jul. 18, 2023, 6 pages.

Sloteman, Donald P., Piercy, mark, "Developing Sealless Integral Motor Pumps Using Axial Field Permanent Magnet", Disk Motors. Imp White Paper, 17th Pumps Symposium (2000), 16 pages.

* cited by examiner

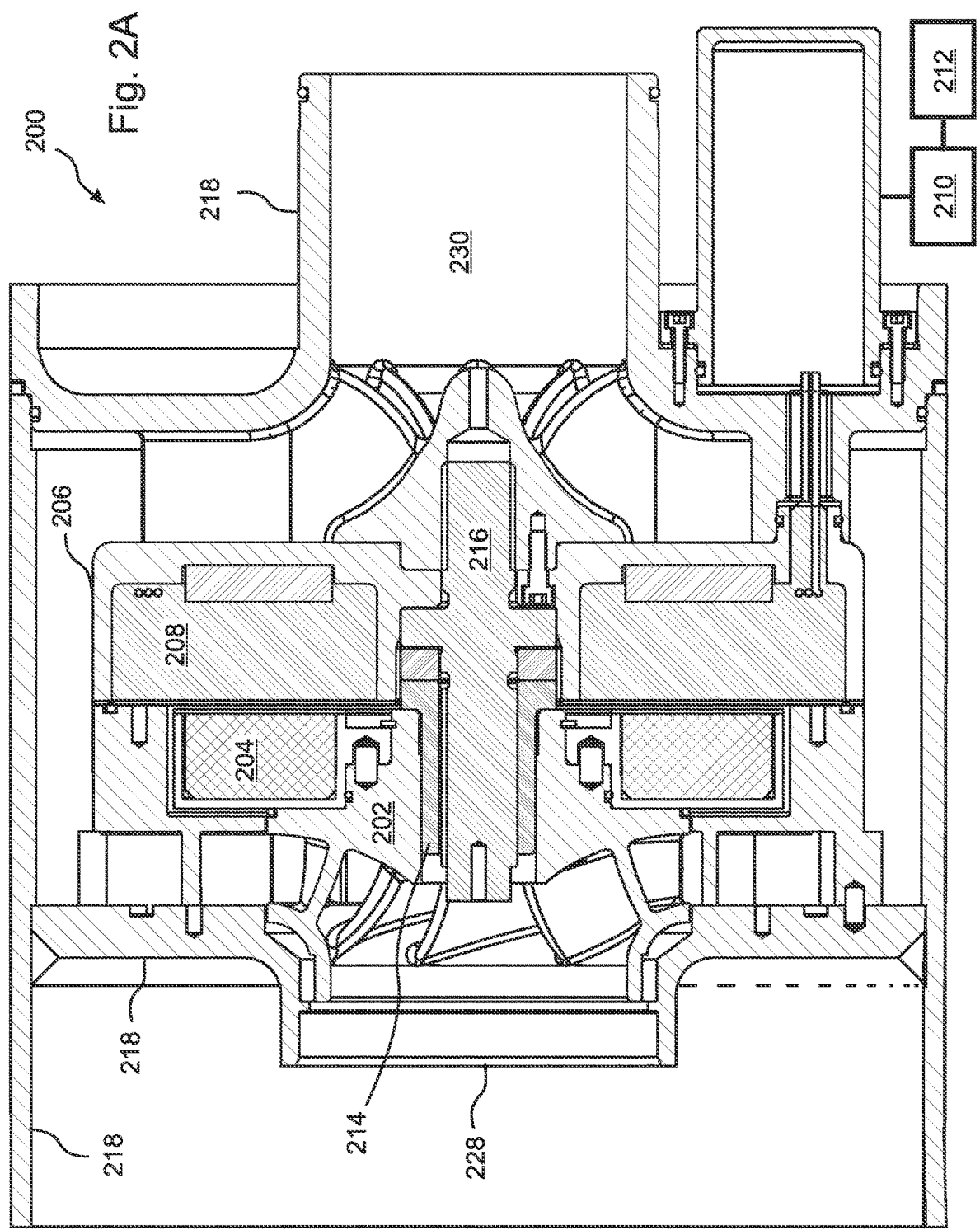

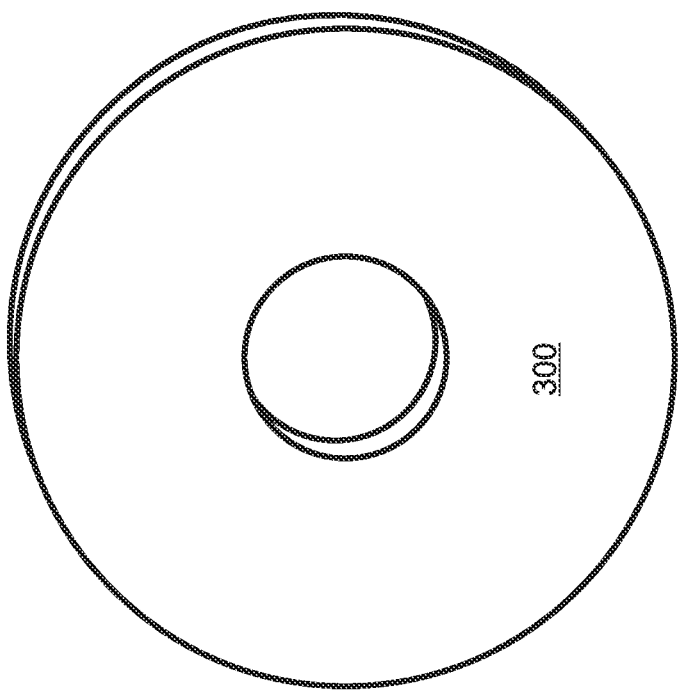
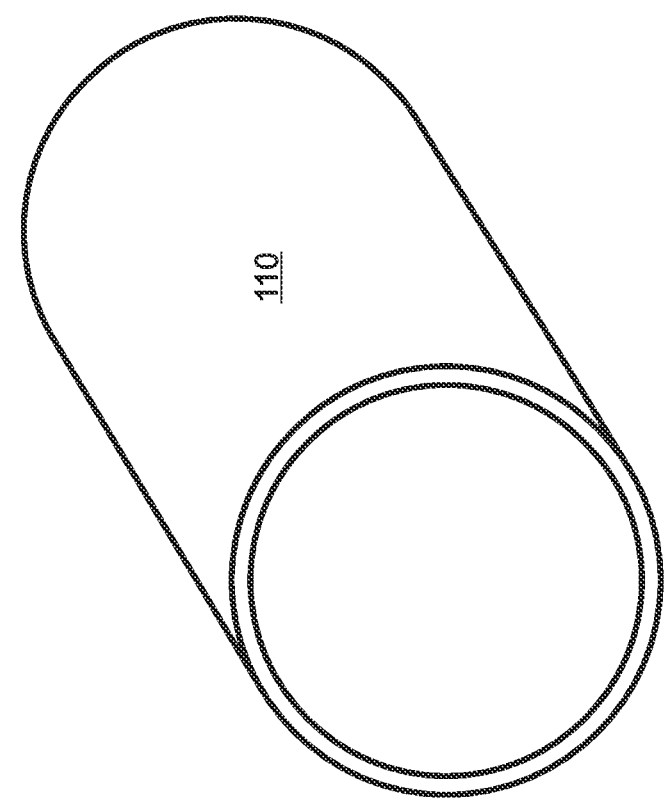
Fig. 3

MECHANISM FOR REDUCING EDDY CURRENT LOSSES IN SEALLESS PUMPS AND TURBINES HAVING DIRECTLY DRIVEN IMPELLERS

RELATED APPLICATIONS

This application is related to U.S. Pat. No. 11,323,003, issued on May 3, 2022, which is also herein incorporated by reference in its entirety for all purposes.

FIELD OF THE INVENTION

The invention relates to pumps and turbines, and more particularly, to integral motor pumps and integral motor turbines.

BACKGROUND OF THE INVENTION

With reference to FIG. 1A, integral motor pumps (IMPs) and integral motor turbines (IMTs), which are sometimes referred to as "sealless" pumps and turbines because the housing 104 is not penetrated by a drive shaft, are centrifugal devices that combine an impeller 100 and a motor or generator 102 into an integrated apparatus within a common housing 104. Typically, the impeller 100 is attached to a rotating shaft 114 that is also fixed to the rotor 108. For simplicity, the present disclosure sometimes refers simply to IMPs, i.e. to pumps that include motors. However, it will be understood that the disclosure presented herein applies equally to turbines that include generators, and that references herein to IMPs and other pumps refer generically to both pumps (IMPs) and turbines (IMTs), while references to motors refer generically to motors and generators or alternators, unless otherwise stated or required by context.

Often, IMPs are submerged in a process fluid, rendering it important in many cases to hermetically seal their sensitive magnetic and electrical assemblies to protect them from contamination and conductive fluids. The stator assembly typically includes an electrical coil assembly 106 comprising laminated steel, insulated copper wire and insulation material. The rotor assembly 108 typically comprises an electrical coil assembly if it is an asynchronous induction type motor, or a permanent magnet assembly if it is a synchronous type motor.

As illustrated in FIGS. 1A-1C, the rotor 108 and stator 106 in a sealless pump or turbine are both typically sealed inside of concentric cylindrical metallic liners 110, 112. With reference to FIG. 1B and the enlarged view of FIG. 1C, one drawback to this design is that eddy currents 116 are generated in the metallic liner 110 of the stator 106, due to the varying magnetic fields 118 that penetrate through the stator liner 110 between the stator 106 and the rotor 108. Eddy currents are not generated in the liner 112 of the rotor 108, because the rotor moves synchronously with the time varying magnetic field.

The eddy currents that are generated in the liner 110 of the stator 106 represent an electrical load to the motor that lowers the overall motor efficiency. The energy generated in the metallic stator liner 110 by the eddy currents 116 will be transferred to thermal energy, raising the temperature of the stator liner, which requires cooling. These eddy current losses are usually deemed as an acceptable loss by canned motor pump manufacturers because the welded metallic stator liner 110 is a robust solution that is a well proven, consistent method to hermetically seal stator assemblies.

However, heating of the stator lining 110 due to eddy currents 116 can be problematic for some IMP applications, for example when pumping a cryogenic liquid such as liquified natural gas LN2, and especially liquid hydrogen (LH2), which is much colder than LN2. The collection, transport, and distribution of LH2 is of increasing importance, due to the growing use of hydrogen as a fuel supply. In particular, "green" hydrogen is expected to play a critical role in reducing carbon emissions over the next few decades. The term "green" hydrogen refers to hydrogen that is produced using renewable clean energy sources, such as solar power and wind power.

Renewable energy generators, such as windmills and solar panels, can sometimes be installed proximate energy consumption locations, such as placing solar panels on the roof of a building or installing a windmill next to a factory. However, this approach is limited, due to siting constraints and economies of scale. Instead, it is often preferable to construct large green energy facilities in optimal locations, such as large solar panel arrays in deserts or windmill farms in coastal waters, and then to convey their power output to remote locations of energy consumption. In addition to taking advantage of favorable environments, and gaining economy of scale, this approach has the advantage of being able to utilize existing electrical power distribution networks to benefit larger numbers of energy consumers. However, it remains necessary to site such facilities near the electrical grids of consumers.

Instead, with reference to FIG. 1D, green energy produced 122 at a remote location 120 that includes a source of water 124 can be used to generate hydrogen gas via hydrolysis 126. The hydrogen gas is compressed 128, and can be distributed to electrical generation plants wherever it is needed, in a manner similar to natural gas distribution. As with natural gas, it is often more efficient to liquify 130 hydrogen gas before it is transported 136, thereby eliminating safety concerns associated with gas pressurization, and enabling an increased energy density to be enclosed within a given container space. Typically, the LH2 is stored 132, and then transferred 134 to ships, train cars, or trucks as needed. Finally, after the LH2 has been shipped 136 to an import location 138, it is transferred 140 and stored 142 in a storage container, from which it can be transferred to local energy generating plants, e.g. by trucks 144.

This approach requires that liquid hydrogen LH2 be pumped from the liquification apparatus 130 into a storage container 132, and then unloaded 134 and pumped to a container of a ship or other transport vehicle 136. The LH2 is then pumped from the transporting vehicle 136 to an import storage container 140, and finally it is pumped from local storage 142 to local distribution vehicles 144 such as trucks. Energy efficient pumping of LH2 with minimal boiloff is therefore a critical component of this approach.

What is needed, therefore, is an integrated motor pump (IMP) or integrated motor turbine (IMT) that minimizes or eliminates heating of the stator liner due to eddy currents.

SUMMARY OF THE INVENTION

The present invention is an integrated motor pump (IMP) or integrated motor turbine (IMT) that minimizes or eliminates heating of the stator liner due to eddy currents. For simplicity, the present disclosure sometimes refers simply to IMPs, i.e. to pumps that include motors. However, it will be understood that the disclosure presented herein applies equally to turbines that include generators, and that references herein to IMPs and other pumps refer generically to both pumps (IMPs) and turbines (IMTs), while references to motors refer generically to motors and generators or alternators, unless otherwise stated or required by context.

The disclosed IMP or IMT comprises an axial field permanent magnet synchronous motor (PMSM). In embodiments, the disclosed IMP or IMT implements a "direct drive" configuration that is similar to configurations disclosed in U.S. Pat. No. 11,323,003, also by the present applicant, which is herein incorporated by reference in its entirety for all purposes. Due to the axial alignment of the permanent magnets and stator coils, rather than being formed as an elongated cylinder, the stator "liner" is a stator cover that is shaped as an annular disk. According to the present invention, the stator cover is non-metallic and non-conductive, thereby preventing eddy currents from being generated in the stator cover.

Because the stator cover is non-metallic, welding of the stator cover to the stator housing is not possible. Instead, embodiments of the present invention provide inner and outer gaskets that form and maintain the integrity of the seal, even at cryogenic temperatures. In embodiments, the stator cover is pressed firmly against the gaskets by inner and outer brackets. In some of these embodiments, the brackets are fixed to the stator housing by welding of the lower rims of the brackets to the stator housing, for example by electron beam welding. In other embodiments, the brackets form friction fits with the stator housing, are attached by set screws, and/or are attached to the stator housing by an adhesive.

In still other embodiments, the stator cover is directly fixed to the stator housing. In embodiments, radially outward and inward perimeters of the stator cover are attached by an adhesive to the axial rims of the stator housing. In some of these embodiments, the adhesive attachment also forms a seal between the stator cover and the stator housing, such that gaskets are not required.

In other of these embodiments, the stator cover extends radially inward and outward beyond the stator housing, and includes inner and outer cover flanges that extend axially proximate inner and outer walls of the stator housing and are attached to the stator housing by an interference fit, adhesive attachment, or similar attachment means as are known in the art. Embodiments include any combination of the above attachment mechanisms for attaching the brackets or cover flanges to the stator housing, except that the cover flanges cannot be welded because the cover is non-metallic.

The present invention is an integral motor pump module (IMP) or integral motor turbine module (IMT) that includes a module housing configured to enable a fluid to pass from an input thereof to an output thereof, a stator housing contained within and fixed to the module housing, a shaft extending axially and proximally from the stator housing, an impeller rotatable with or about the shaft, a plurality of permanent magnets fixed to a distal face of the impeller and configured to pass in proximity to a proximal face of the stator housing when the impeller rotates about the shaft, a plurality of stator coils contained within an interior of the stator housing and configured to be proximate the permanent magnets as they pass in proximity to the proximal face of the stator housing, the permanent magnets and stator coils being axially separated by a rotor-stator gap, and a non-conductive stator cover within the rotor-stator gap, the stator cover being fixed to the stator housing and forming a cover seal with the stator housing, said cover seal being configured to exclude a process fluid from entering the interior of the stator housing.

In embodiments, the cover seal comprises at least one gasket interposed between the stator cover and the stator housing.

Any of the above embodiments can be annular embodiments in which the stator housing extends around the shaft, and the stator cover is configured as an annular disk.

In some of these annular embodiments, the cover seal comprises an inner gasket radially proximate an inner edge of the annular stator cover, and an outer gasket radially proximate an outer rim of the annular stator cover.

Any of the annular embodiments can include a pair of brackets configured respectively to radially overlap inner and outer perimeters of the stator cover, the brackets being fixed to the stator housing and configured to press the stator cover against the stator housing. In some of these embodiments the brackets are attached to the stator housing by at least one of welding and adhesive attachment. In any of these embodiments the brackets can include bracket flanges that extend distally proximate radially inward and outward facing outer surfaces of the stator housing. In some of these embodiments the bracket flanges form interference fits with the stator housing. In other of these embodiments where the bracket flanges comprise radial protrusions that extend into indentations provided in the stator housing, or the stator housing comprises radial protrusions that extends into indentations provided in the bracket flanges. In still other of these embodiments, the bracket flanges are attached to the stator housing by set screws. In yet other of these embodiments, the bracket flanges are welded to the stator housing. In some of these embodiments the bracket flanges are welded to the stator housing by electron beam welding.

Or, the stator cover can be directly fixed to the stator housing. In some of these embodiments, the stator cover is directly fixed to the stator housing. by an adhesive. In some of these embodiments, the cover seal is formed by the adhesive.

In any of these embodiments that are annular, the stator cover can include cover flanges that extend distally proximate radially inward and radially outward facing outer surfaces of the stator housing. The cover flanges can form interference fits with the stator housing. In other embodiments the cover flanges are attached by an adhesive to the stator housing. In other embodiments the cover flanges are attached to the stator housing by set screws. In still other embodiments the cover flanges comprise radial protrusions that extend into indentations provided in the stator housing, or the stator housing comprises radial protrusions that extend into indentations provided in the cover flanges.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2A is a sectional view of an IMP or IMT in an embodiment of the present invention, where the figure is drawn to scale except for elements 210 and 212;

FIG. 3 is a simplified comparison of the shape of the prior art stator liner of FIG. 1A with an annular stator cover according to embodiments of the present invention;

DETAILED DESCRIPTION

The present invention is an integrated motor pump (IMP) or integrated motor turbine (IMT) that minimizes or eliminates heating of the stator liner due to eddy currents. For simplicity, the present disclosure sometimes refers simply to IMPs, i.e. to pumps that include motors. However, it will be understood that the disclosure presented herein applies equally to turbines that include generators, and that references herein to IMPs and other pumps refer generically to both pumps (IMPs) and turbines (IMTs), while references to motors refer generically to motors and generators or alternators, unless otherwise stated or required by context.

Figure 1A:
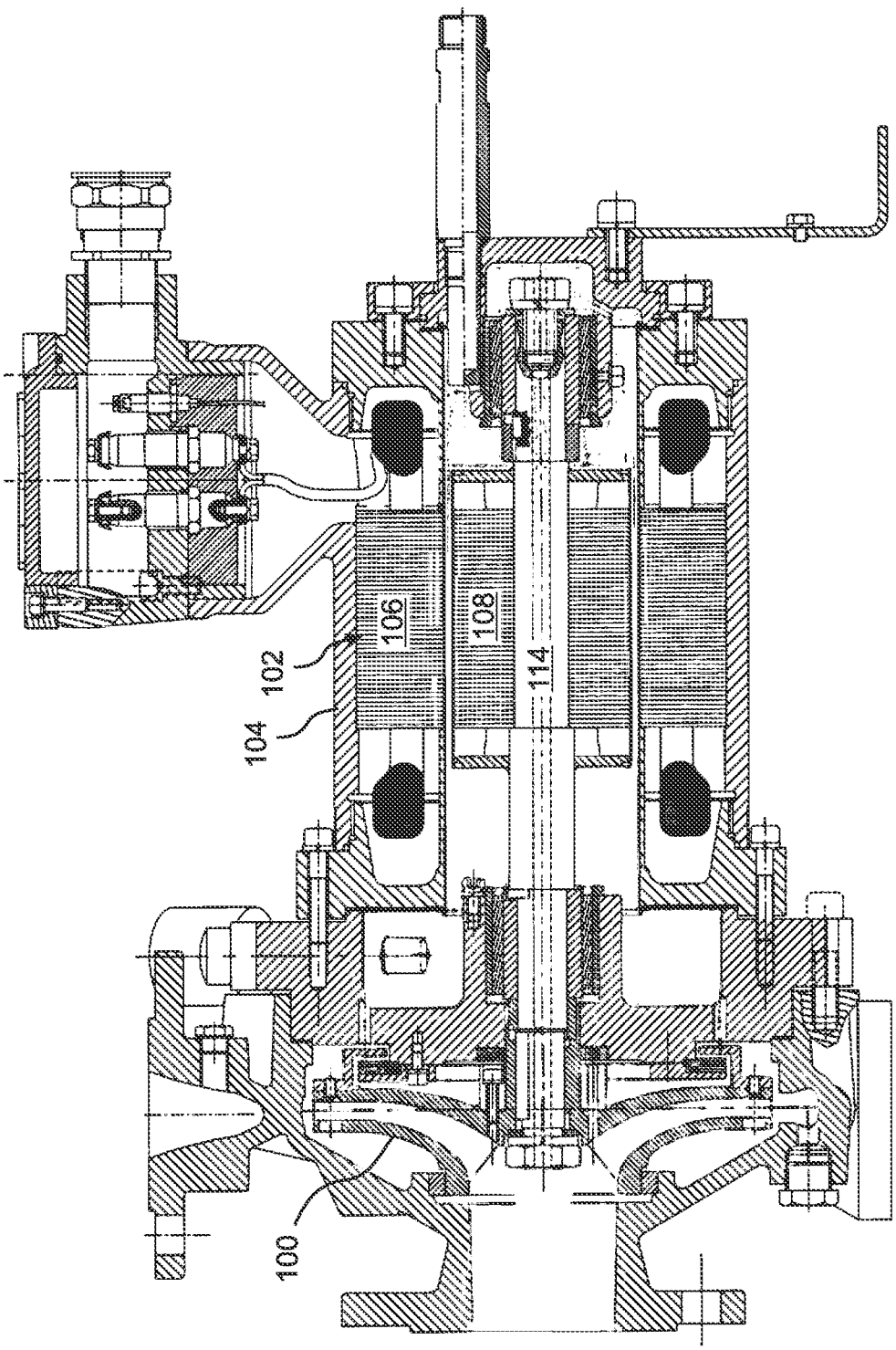
FIG. 1A is a sectional view of a sealless pump of the prior art.
Figure 1B:
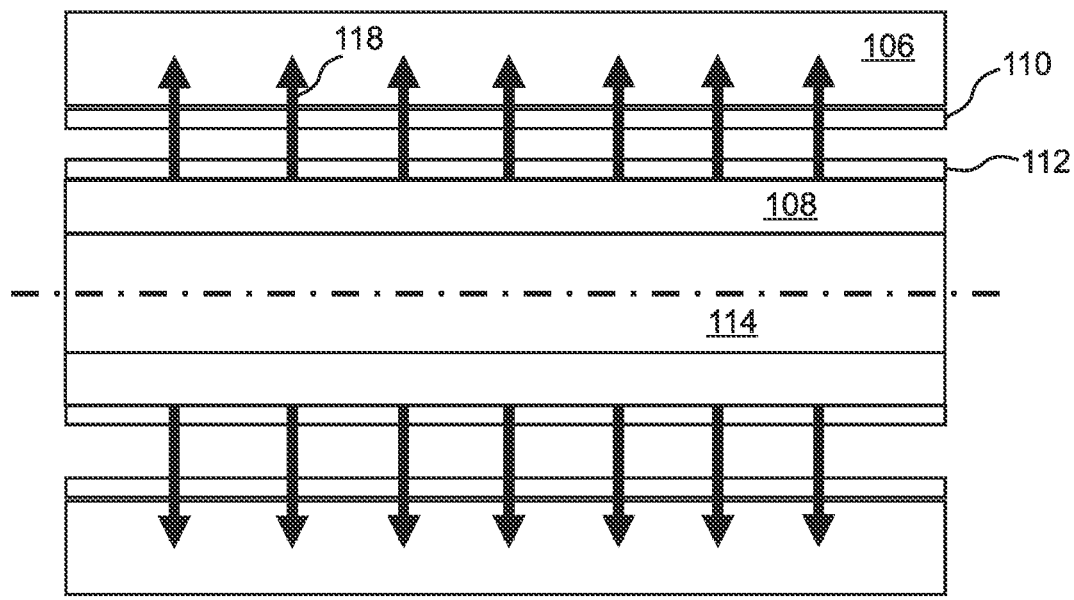
FIG. 1B is a simplified cross-sectional view illustrating radial extension of magnetic fields from the rotor assembly to the stator coils according to the pump of FIG. 1A.
Figure 1C:
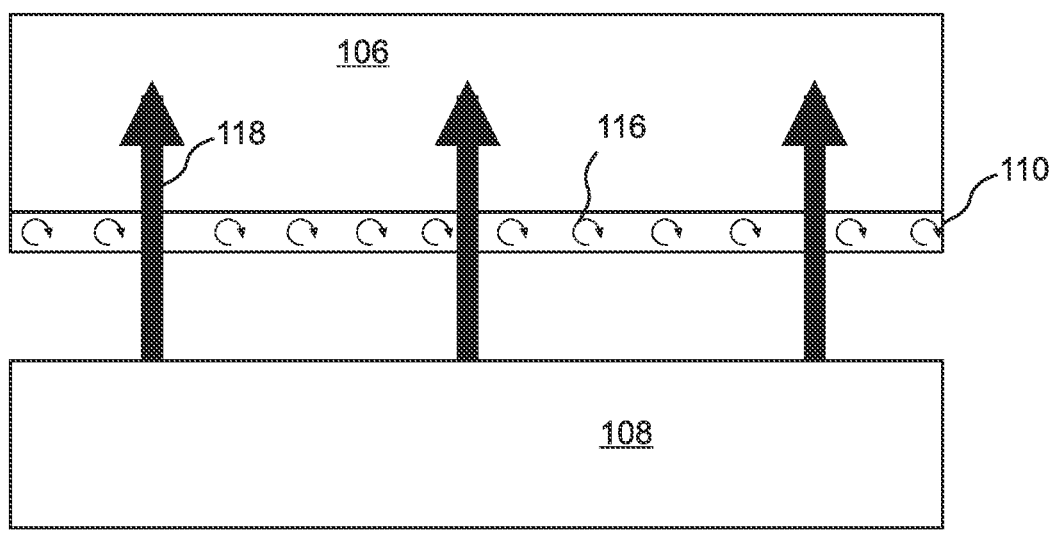
FIG. 1C is a close-up view of a portion of FIG. 2 showing the generation of eddy currents in the stator lining of the stator.
Figure 1D:
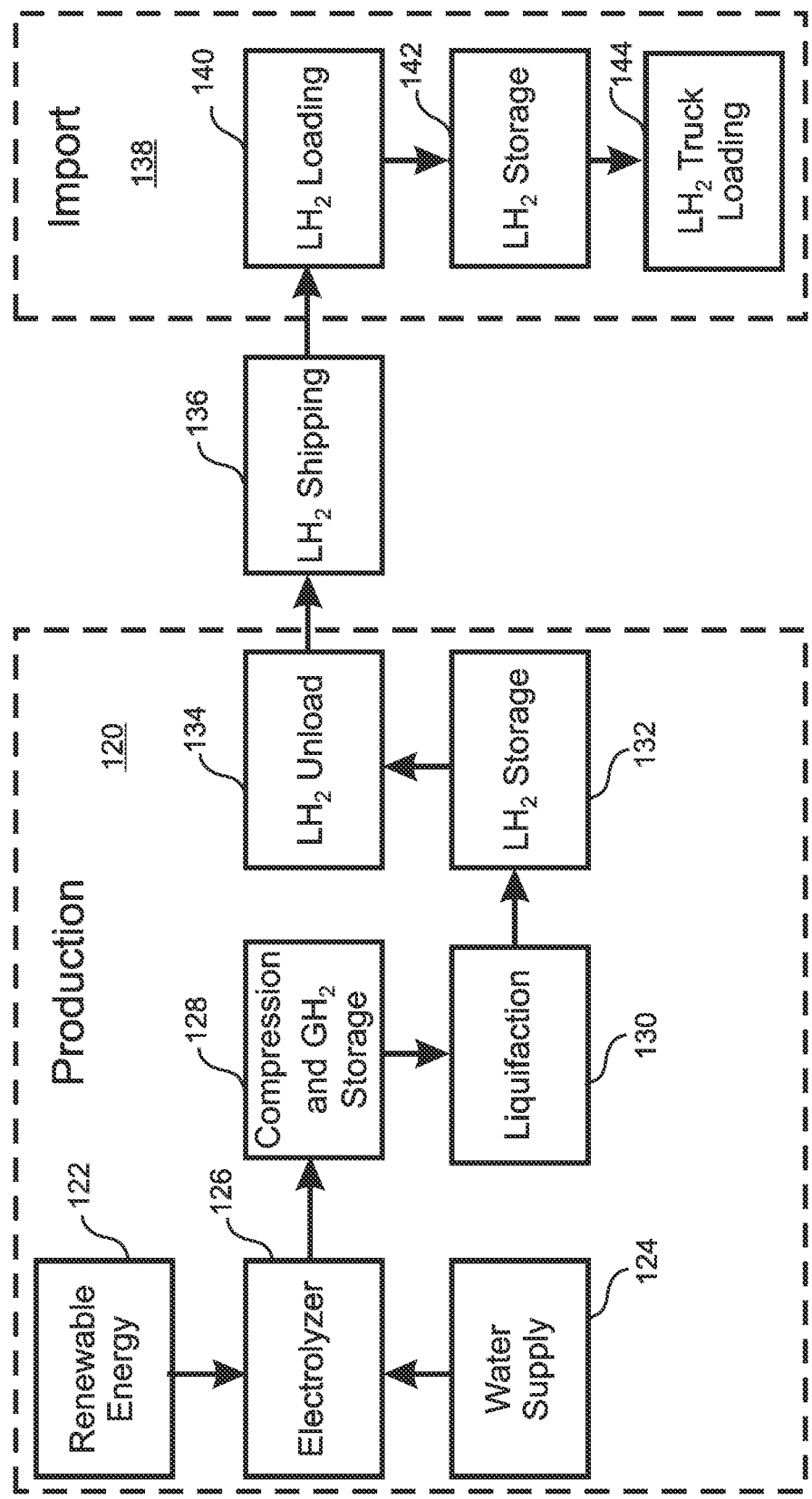
FIG. 1D is a flow diagram illustrating the use of liquid hydrogen in the prior art as a medium for transferring energy from a green energy production site to an energy consumption location.
Figure 2B:
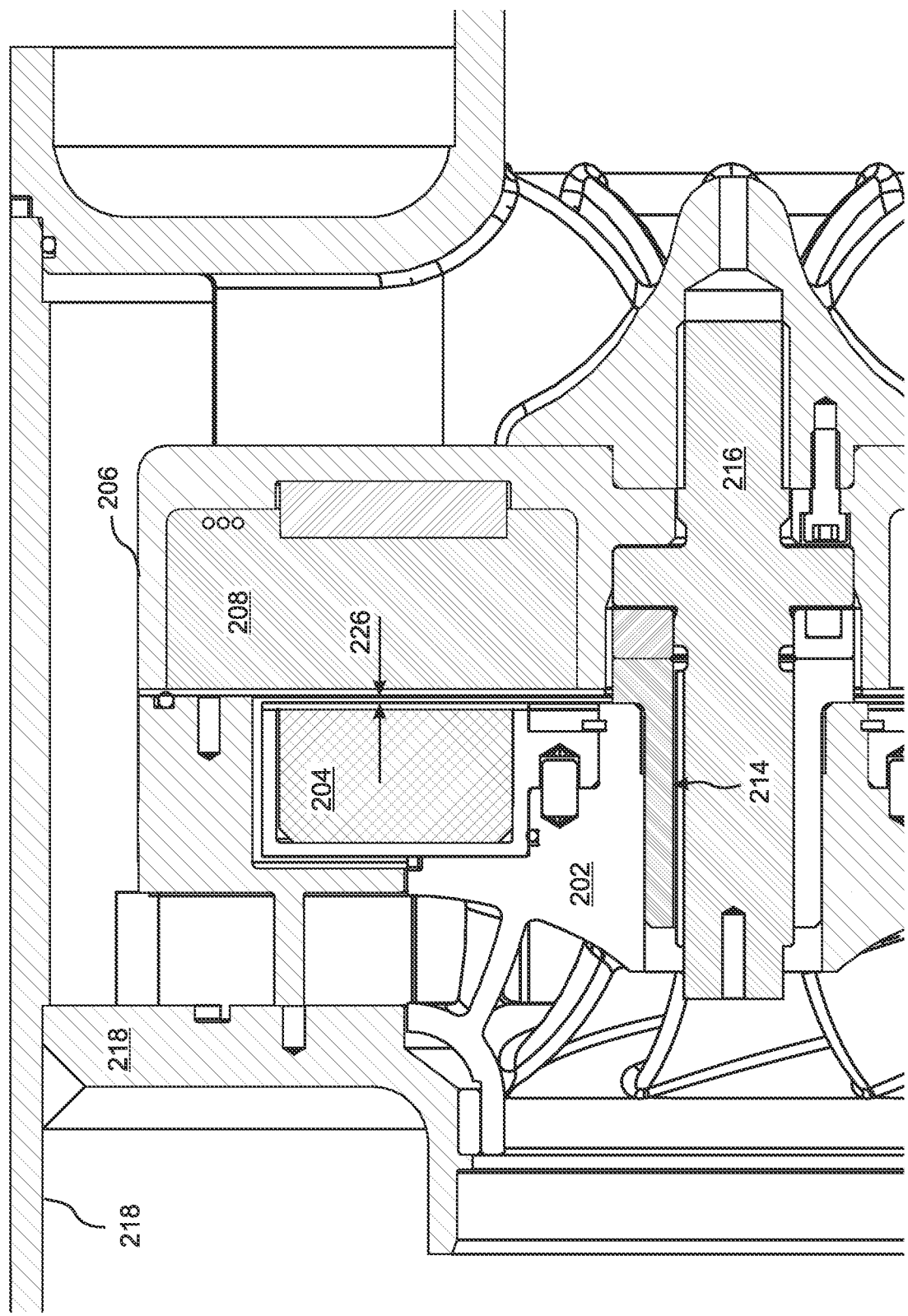
FIG. 2B is a close-up view drawn to scale of a portion of the IMP or IMT module of FIG. 2A.

The disclosed IMP or IMT comprises an axial field permanent magnet synchronous motor (PMSM). With reference to FIGS. 2A and 2B, in embodiments, the disclosed IMP or IMT implements a "direct drive" configuration that is similar to configurations disclosed in U.S. Pat. No. 11,323,003, also by the present applicant, which is herein incorporated by reference in its entirety for all purposes. Rather than configuring an armature 108 and stator 106 in a separate motor 102 to drive a shaft 114 that drives an impeller 100, as illustrated in FIG. 1A, the disclosed IMP or IMT includes permanent magnets 204 that are attached directly to the impeller 202, and arranged such that they are proximally and axially aligned with the stator coils 208 provided in a stator housing 206, such that the stator is able to impart torque directly to the impeller 202, rather than imparting torque to a shaft 114, and thereby indirectly imparting torque to the impeller 100. In some applications, the shaft 216 is firmly anchored, either directly or indirectly, to the stator housing 206, while the impeller 202 is rotationally supported on the shaft 216 by a bearing 214, such that only the impeller 202, permanent magnets 204, and bearing 214 rotate. In other embodiments, the impeller 202 is fixed to the shaft 216, and the shaft 216 is supported by a bearing, so that it rotates together with the impeller 202.

FIG. 2A illustrates an IMP in an embodiment that is configured to draw a fluid from a module inlet 228 and deliver the fluid to a module outlet 230. The "rotor," i.e. the assembly of rotating components, in the IMP module 200 comprises an impeller 202 and a plurality of permanent magnets 204 that are cooperative with the impeller 202. The IMP module 200 further includes a stator housing 206 containing stator coils 208 that are positioned in axial opposition to the permanent magnets 204.

The stator coils 208 are energized by a power source 210 that is actuated by a controller 212, and the magnets 204 and stator coils 208 function cooperatively together as a synchronous motor that applies rotational torque directly to the impeller 202. In some embodiments, the power source 210 is an adjustable speed drive (ASD), such as a variable frequency drive (VFD), which enables the impeller rotation rate to be variable.

In addition to the impeller 202 and the permanent magnets 204, the rotor includes a bearing 214 configured to allow the rotor to rotate about a fixed, non-rotating shaft 216, which functions as a short "stub." In the illustrated embodiment, the bearing 214 is product lubricated, and the shaft 216 is firmly anchored to the stator housing 206, which is firmly attached to the module housing 218. The shaft 216 is only slightly longer than the bearing 214, and does not rotate. It can be seen in the close-up, partial view of FIG. 2B that only a very narrow gap 226 separates the permanent magnets 204 from the stator coils 208.

With reference to FIG. 3, due to the axial alignment of the permanent magnets 204 and stator coils 208, rather than being configured as an elongated cylinder 110, the stator "liner" is an annular stator cover 300.

Figure 4:
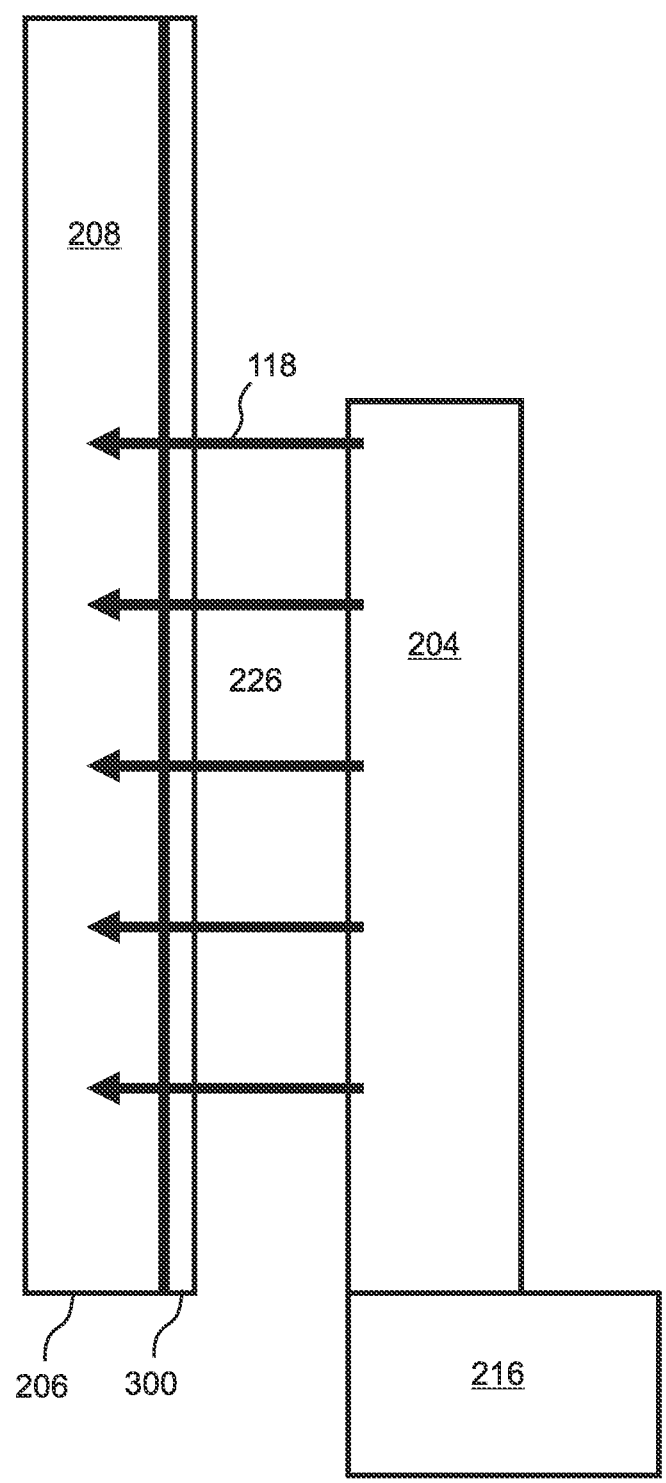
FIG. 4 is a simplified drawing that illustrates axial penetration of the stator cover by magnetic fields according to the present invention.

According to the present invention, with reference to FIG. 4, instead of welding a metallic cover to the stator housing, a non-magnetic, non-conductive stator cover 300 is sealed to the stator housing 206, such that the magnetic fields 118 extend axially across the rotor-stator gap 226 from the permanent magnets 204 through the non-conductive stator cover 300 to the stator coils 206. Because the stator cover 300 is non-conductive, eddy currents are not generated in the stator cover 300 by the magnetic fields.

Figure 5A:
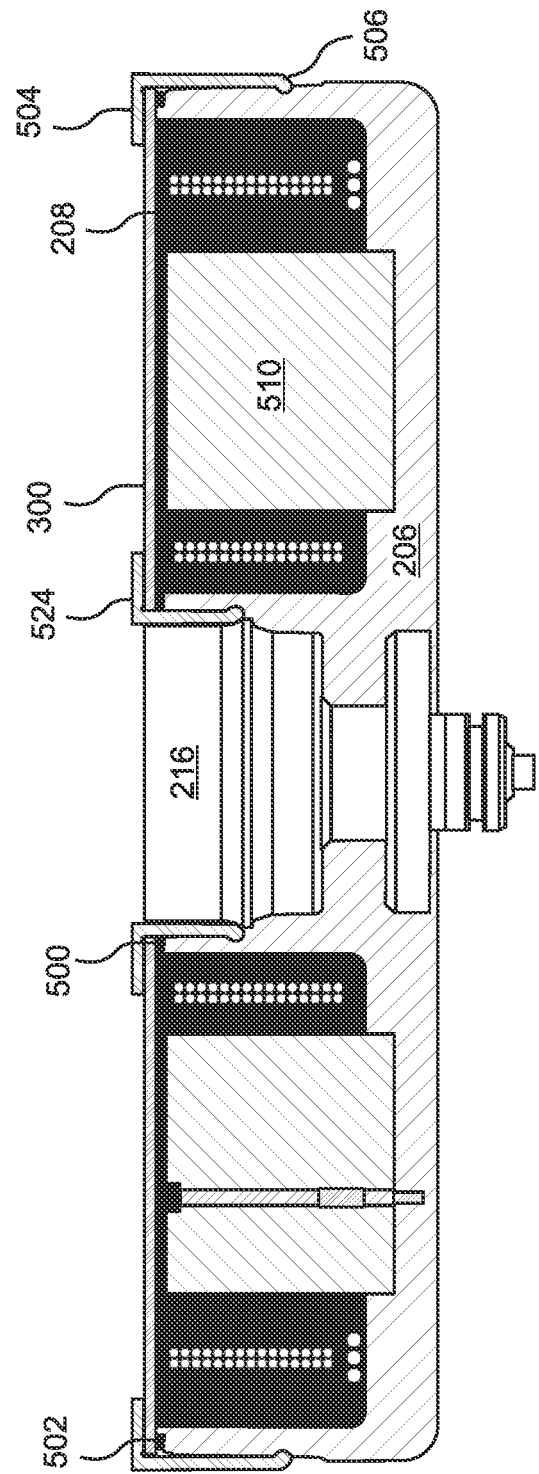
FIG. 5A is a sectional view drawn to scale of a stator in an embodiment of the present invention where the stator cover is pressed against gaskets by inner and outer brackets that are welded to the stator housing.
Figure 5B:
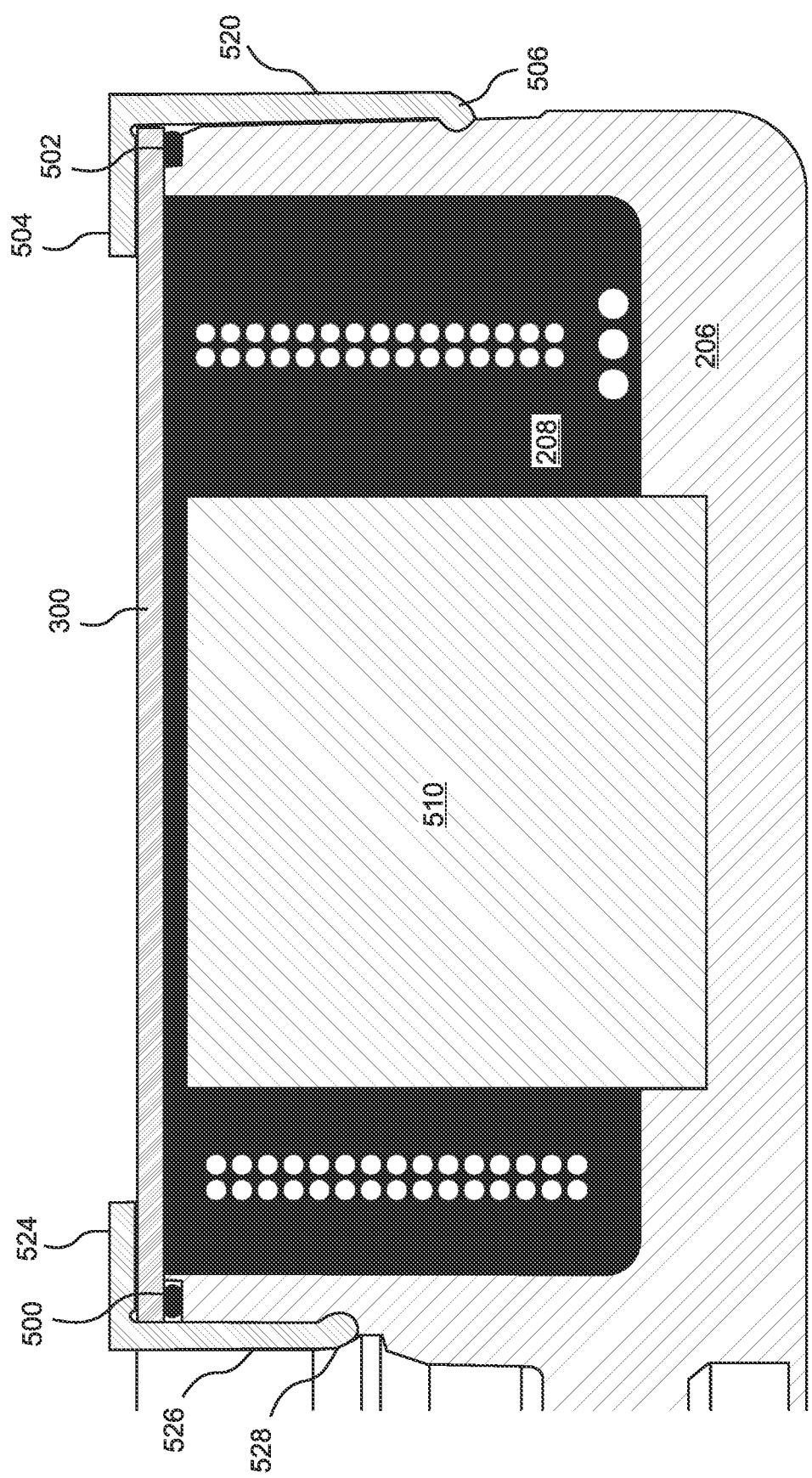
FIG. 5B is a close-up view drawn to scale of the stator of FIG. 5A.
Figure 6:
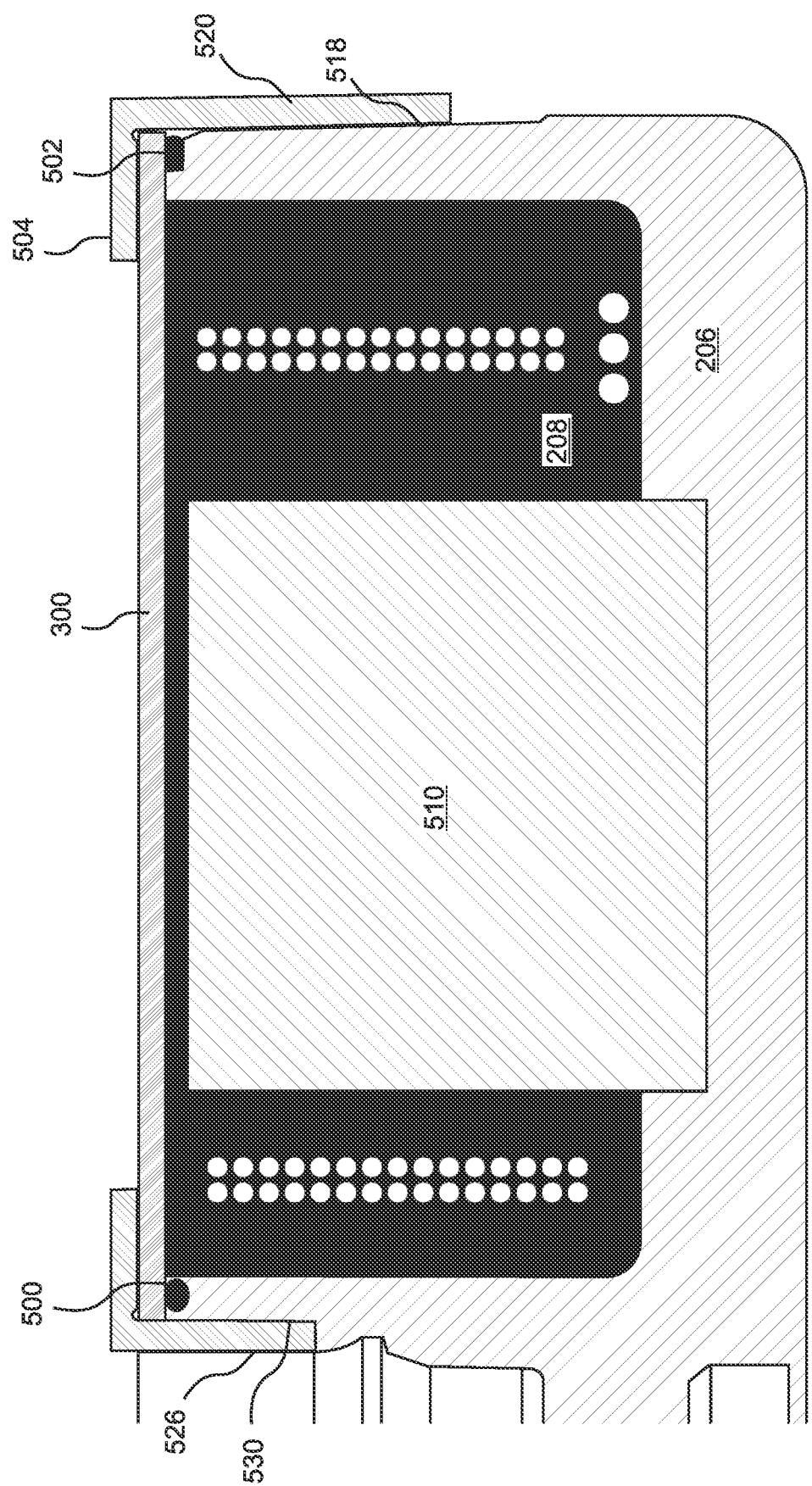
FIG. 6 is a close-up view drawn to scale of a stator that is similar to FIG. 5A, but for which the brackets are fixed to the stator housing by an interference fit and/or an adhesive.

In the embodiment of FIGS. 5A-6, the seal between the annular stator cover 300 and the stator housing 206 is formed by inner 500 and outer 502 gaskets. In the illustrated embodiments, inner 524 and outer 504 brackets that include axially extending bracket flanges 520, 526 press the stator cover 300 firmly against the O-rings 500, 502, and maintain the integrity of the seal, even at cryogenic temperatures. In FIGS. 5A and 5B, the brackets 504, 524 and are fixed to the stator housing 206 by welds 506, 528 at the distal rims of the brackets 504, 524 to the stator housing 206, formed for example by electron beam welding.

With reference to FIG. 6, in other embodiments the bracket flanges 520, 526 are fixed to the stator housing 206 due to an interference fit and/or by application of an adhesive to the interface 518, 530 between the bracket flanges 520, 526 and the stator housing 206.

Figure 7:
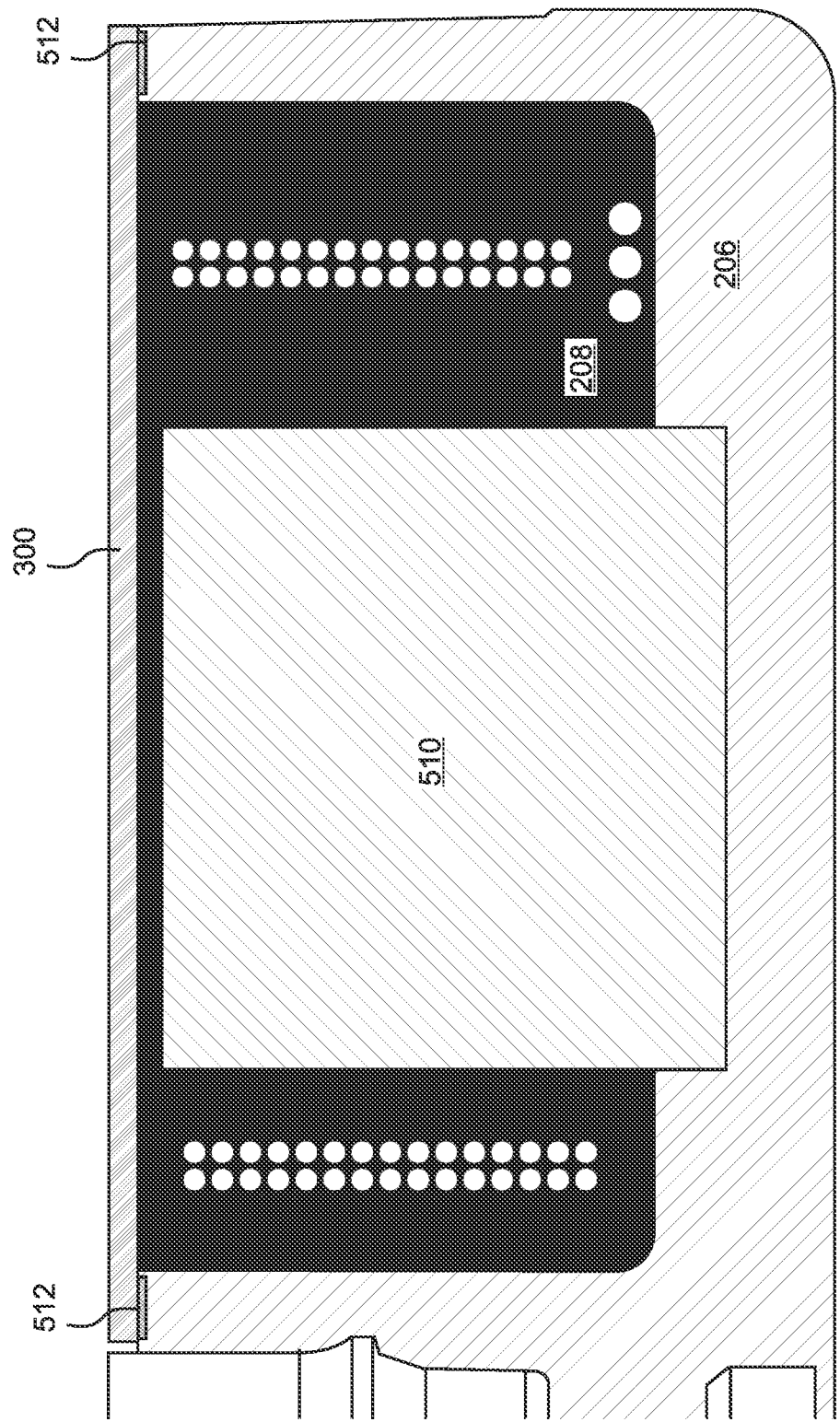
FIG. 7 is a close-up view drawn to scale of an embodiment of the present invention in which the stator cover is directly bonded and sealed to the stator housing by an adhesive.

With reference to FIG. 7, in other embodiments the stator cover 300 is directly fixed to the stator housing 206. In the embodiment of FIG. 7, the axially outward and inward perimeters of the annular stator cover 300 are attached by an adhesive 512 to the axially faxing proximal inner and outer rims of the stator housing 206. In the illustrated embodiment, the seals between the stator cover 300 and the stator housing 206 are formed entirely by the adhesive 512, and the gaskets 500, 502 are omitted.

Figure 8:
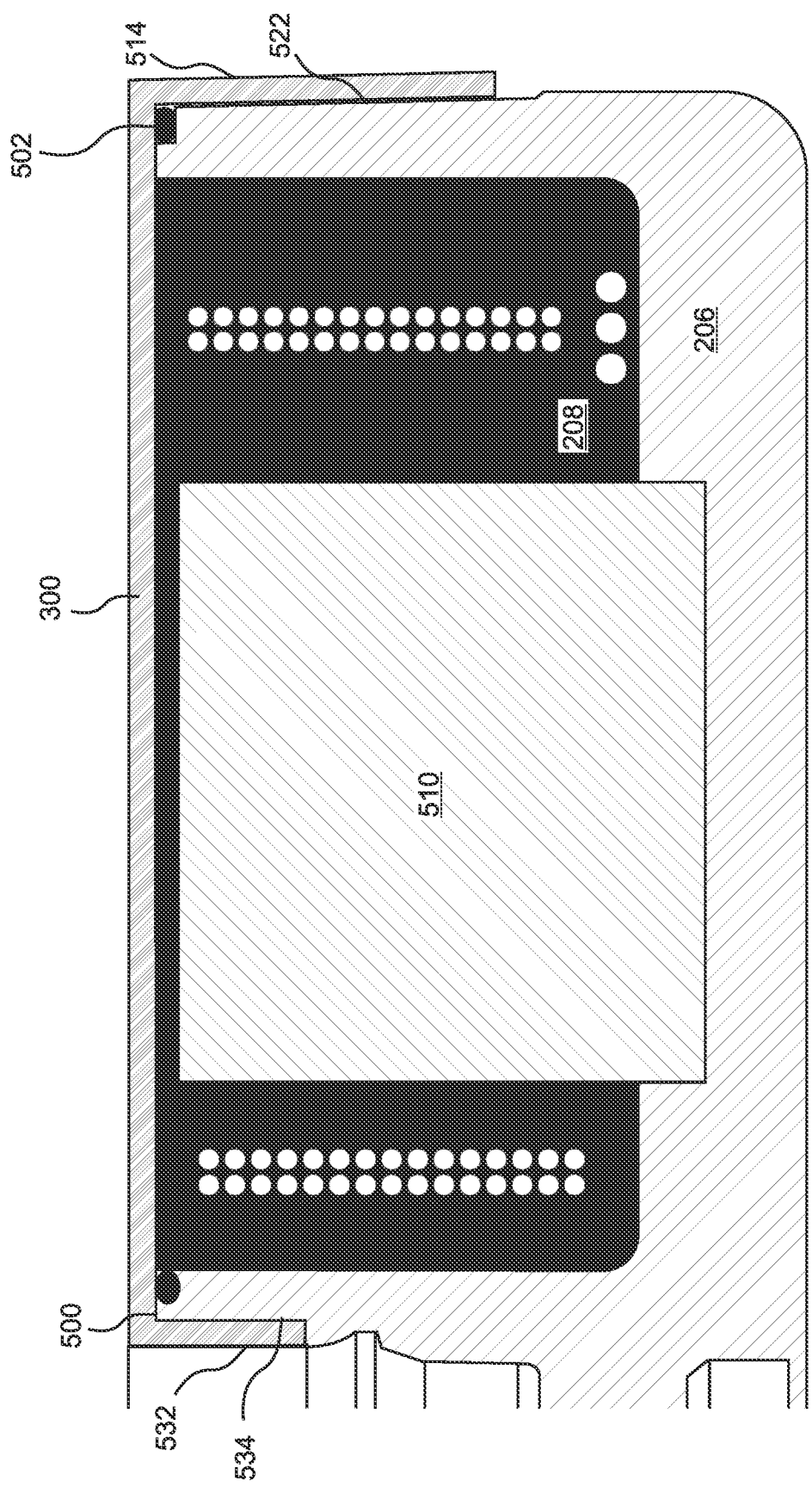
FIG. 8 is a close-up view drawn to scale of an embodiment of the present invention in which the stator cover is sealed to the stator housing by gaskets and directly bonded to the stator housing by an interference fit and/or adhesive bond between axial inner and outer cover flanges and the stator housing.

In the embodiments of FIG. 8, the stator cover further comprises inner 532 and outer 514 cover flanges that extends axially and distally along the radially inward and outward exterior surfaces of the stator housing 206. In the illustrated embodiment, the cover flanges 514, 532 are fixed to the stator housing 206 by interference fits, and/or by an adhesive applied to the interfaces 522, 534 between the cover flanges 514, 532 and the stator housing 206.

Figure 9:
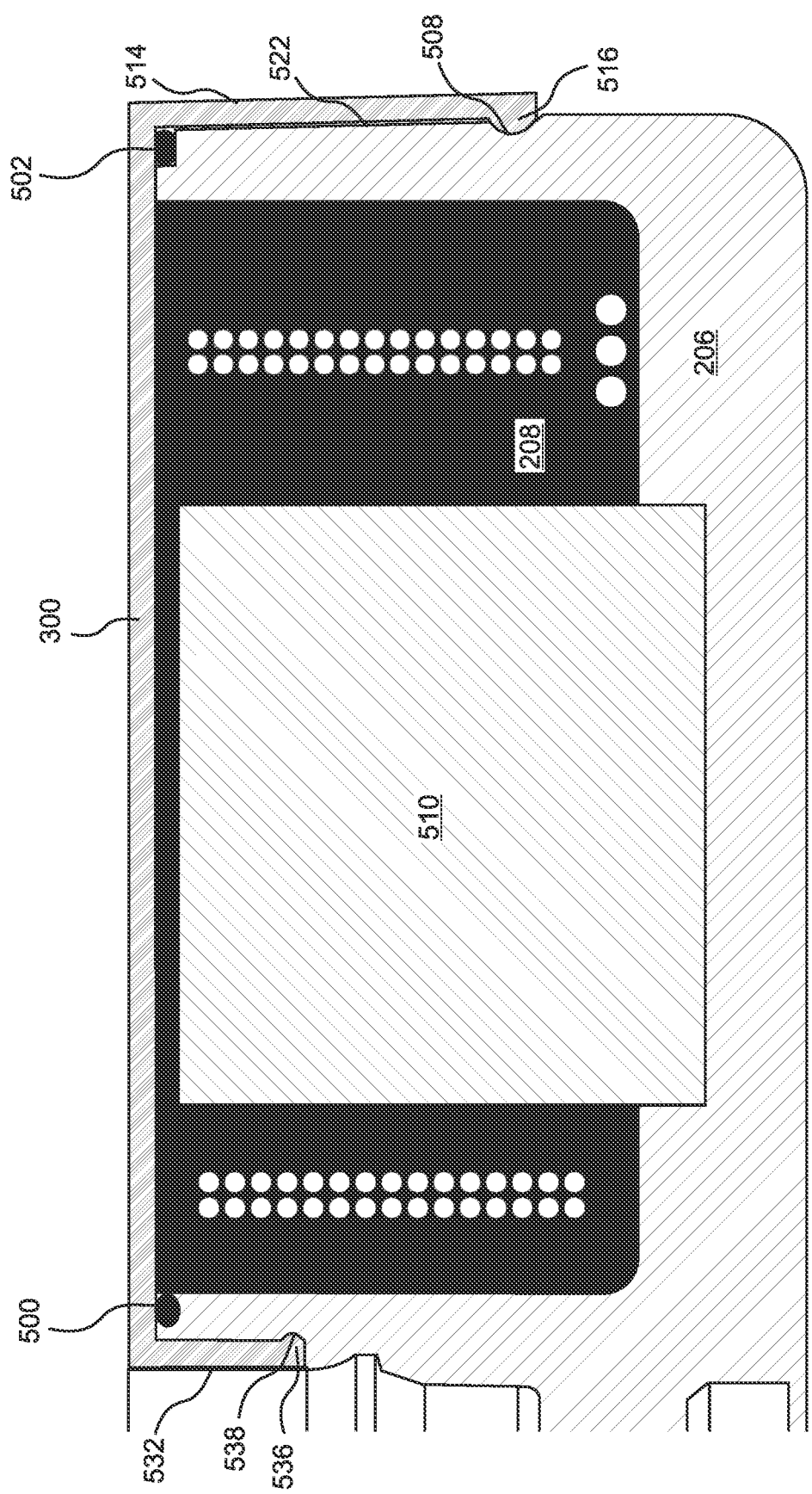
FIG. 9 is a close-up view drawn to scale of an embodiment of the present invention in which the stator cover is sealed to the stator housing by gaskets and attached to the stator housing by extension of inward bulges provided on the cover flanges into indentations provided in the stator housing.

The embodiment of FIG. 9 is similar to FIG. 8, except that the cover flanges 514, 532 are fixed to the stator housing 206 at least partly due to extension of inward-protruding bulges 516, 538 at the distal rims of the inner 532 and outer 514 cover flanges into a corresponding indented rings 508, 536 provided in the stator housing 206. In similar embodiments, outward-protruding bulges are provided on the stator housing 206 that extends into indented rings provided on the inner surfaces of the cover flanges 514, 532.

Figure 10A:
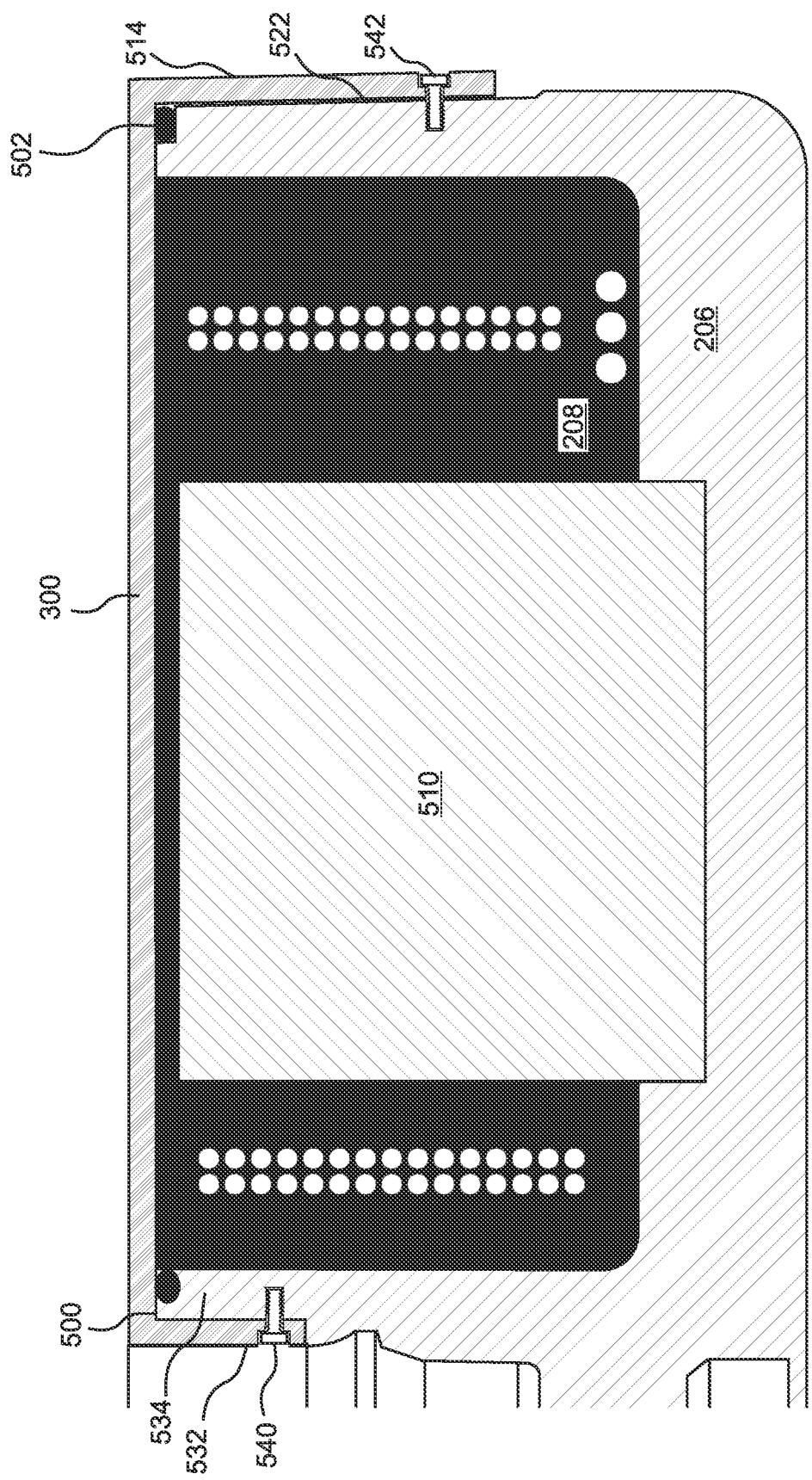
FIG. 10A is a close-up view drawn to scale of an embodiment of the present invention in which the stator cover is sealed to the stator housing by gaskets and attached to the stator housing by set screws inserted through passage holes provided in the cover flanges and threaded into threaded holes provided in the stator housing.
Figure 10B:
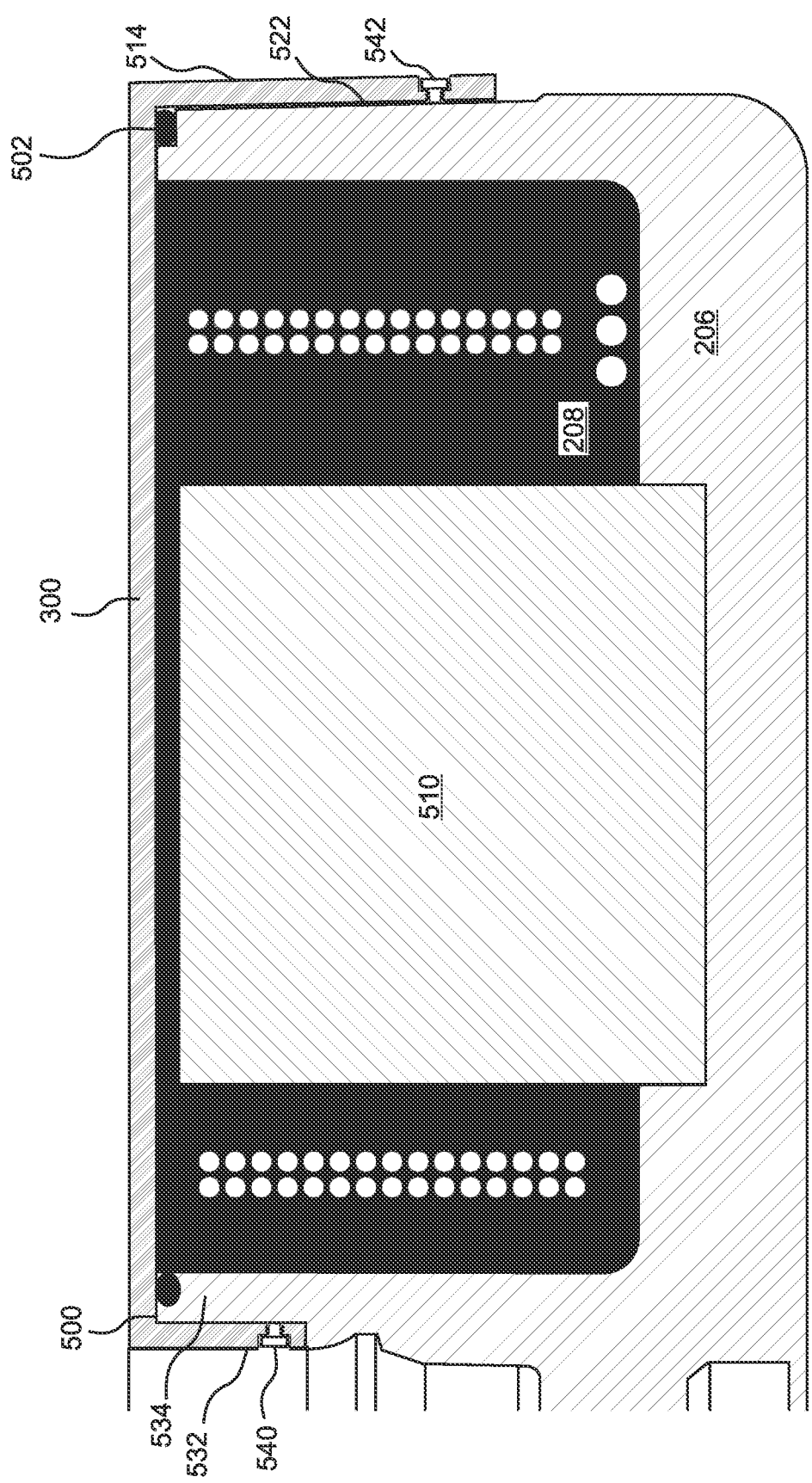
FIG. 10B is a close-up view drawn to scale of an embodiment of the present invention in which the stator cover is sealed to the stator housing by gaskets and attached to the stator housing by set screws threaded into threaded holes provided in the cover flanges and pressed against the stator housing.

The embodiment of FIG. 10A is similar to FIG. 8, except that the cover flanges 514. 532 are fixed to the stator housing 206 at least partly due to set screws set screws 540, 542 inserted through passage holes provided in the cover flanges 514, 532 and threaded into threaded holes provided in the stator housing 206. The embodiment of FIG. 10B is similar, except that the set screws 540, 542 are threaded into threaded holes provided in the cover flanges and pressed against the stator housing 206.

Embodiments include any combination of the above mechanisms for attachment of the stator cover 300 to the stator housing 206 or attachment of the brackets to the stator housing 206, except that the cover flanges 532, 514 cannot be welded to the stator housing 206 because the cover flanges 532, 514 are non-metallic. It will be noted that in FIGS. 5A through 10, the stator coils 208 are wound around cores 510 within the stator housing 206, which can be laminated iron cores 208.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. An integral motor pump module (IMP) or integral motor turbine module (IMT) comprising:
   a module housing surrounding a central axis of the IMP or IMT and configured to enable a fluid to pass axially from an input thereof to an output thereof;
   a stator housing contained within and fixed to the module housing, an interior of the stator housing being radially bounded by a cylindrical inner housing wall surrounding the central axis and a cylindrical outer housing wall surrounding the inner housing wall, wherein the inner housing wall comprises an inner housing attachment surface that faces radially inward toward the central axis, and the outer housing wall comprises an outer housing attachment surface that faces radially outward from the central axis, wherein the fluid flows between the module housing and the outer housing attachment surface of the stator housing as it flows from the input to the output of the module housing;
   a shaft extending coaxially with the central axis and proximally from the stator housing, wherein the inner housing wall surrounds the shaft;
   an impeller rotatable with or about the shaft;
   a plurality of permanent magnets fixed to a distal face of the impeller and configured to pass in proximity to a proximal face of the stator housing when the impeller rotates with or about the shaft;
   a plurality of stator coils contained within the interior of the stator housing and configured to be proximate the permanent magnets as they pass in proximity to the proximal face of the stator housing, the permanent magnets and stator coils being axially separated by a rotor-stator gap; and
   a non-conductive annular stator cover extending radially between proximate axial ends of the inner and outer housing walls within the rotor-stator gap, the stator cover forming a cover seal with the inner and outer housing walls, said cover seal being configured to exclude a process fluid from entering the interior of the stator housing;
   wherein the stator cover is fixed to the inner and outer housing walls by an outer axial flange that axially overlaps and is fixed to the outer housing attachment surface, and by an inner axial flange that axially overlaps and is fixed to the inner housing attachment surface.

2. The IMP or IMT of claim 1, wherein the cover seal comprises at least one gasket interposed axially between the stator cover and the stator housing.

3. The IMP or IMT of claim 2, wherein the cover seal comprises an inner gasket interposed axially between the stator cover and the axial proximate end of the inner housing wall, and an outer gasket interposed axially between the stator cover and the axial proximate end of the outer housing wall.

4. The IMP or IMT of claim 1, further comprising
an outer bracket that comprises the outer axial flange and an outer radial flange that extends radially inward from the outer axial flange towards the central axis, thereby overlapping an outer portion of the stator cover; and
an inner bracket that comprises the inner axial flange and an inner radial flange that extends radially outward from the inner axial flange away from the central axis, thereby overlapping an inner portion of the stator cover;
the inner and outer brackets being configured to press the stator cover axially against the stator housing.

5. The IMP or IMT of claim 1, wherein the inner and outer axial flanges are attached to the inner and outer attachment surfaces, respectively, by welding.

6. The IMP or IMT of claim 5, wherein the inner and outer axial flanges are welded to the stator housing by electron beam welding.

7. The IMP or IMT of claim 1, wherein the inner and outer axial flanges are attached to the inner and outer attachment surfaces, respectively, by adhesive attachment.

8. The IMP or IMT of claim 1, wherein the inner and outer axial flanges are attached to the inner and outer attachment surfaces, respectively, by interference fits.

9. The IMP or IMT of claim 7, wherein:
the inner and outer axial flanges comprise radial protrusions that extend into indentations provided in the inner and outer attachment surfaces, respectively; or
the inner and outer attachment surfaces comprise radial protrusions that extend into indentations provided in the inner and outer axial flanges, respectively.

10. The IMP or IMT of claim 1, wherein the inner and outer axial flanges are attached to the inner and outer attachment surfaces, respectively, by set screws.

11. The IMP or IMT of claim 7, wherein the cover seal is formed by the adhesive attachment.

12. The IMP or IMT of claim 1, wherein:
the inner and outer axial flanges extend axially from, and are monolithic with, the housing cover.

\* \* \* \* \*